United States Patent

[11] 3,555,260

[72] Inventor Jimmy G. Karohl
 Fairfield, Conn.
[21] Appl. No. 710,375
[22] Filed Mar. 4, 1968
[45] Patented Jan. 12, 1971
[73] Assignee The Perkin-Elmer Corporation
 Norwalk, Conn.
 a corporation of New York

[54] CHROMATOGRAM ANALYZER
 4 Claims, 10 Drawing Figs.
[52] U.S. Cl........................................... 235/183,
 73/23.1; 235/92, 235/159.51, 235/151.35
[51] Int. Cl............................................G06f 15/20,
 G06g 7/18
[50] Field of Search........................................ 235/92,
 183, 150.51, 151.35; 73/23.1

[56] References Cited
 UNITED STATES PATENTS
 3,284,616 11/1966 Ernyel et al................... 235/151.35
 3,412,241 11/1968 Spence et al................... 235/183
 OTHER REFERENCES
 P.P. Briggs: Computer controlled Chromatographs Control Engineering Sept. 1967 Vol. 14; No. 9 pages 75—80

Primary Examiner—Eugene G. Botz
Assistant Examiner—Felix D. Gruber
Attorney—Edward R. Hyde, Jr.

ABSTRACT: A chromatogram analyzer is provided which continuously computes successive digital sums A of pulses derived from an analogue to digital converter, each sum being representative of the average amplitude of an analogue input signal during N successive intervals of time $\Delta t_c$. Successively generated sums A, formed during a prior period of time T, are stored and from this data the average rate of change of slope $B'$ of the signal baseline component is calculated. The amplitude of a sum occurring next in time is predicted from this data and is compared with the sum $A_o$ as actually measured. A difference in amplitude $\underline{A_0}$ existing between $A_o$ and the predicted baseline value $B_p$ is compared with preestablished criteria PC for sensing and indicating the beginning of a signal peak and the existence of a valley between unresolved peaks. A difference in amplitude $I_s$ existing between $\underline{A_0}$ and $\underline{A_{0-1}}$ is compared for sensing and indicating peak tops and termination of peak. Upon sensing the initiation of a peak, the difference $\underline{A_0}$ between predicted baseline $B_p$ and actual sum $A_o$ is accumulated for each of the intervals N of the peak. A highly accurate baseline corrected peak integration is thereby provided.

PATENTED JAN 12 1971

INVENTOR.
JIMMY G. KAROHL

BY

Frank J. Thompson
ATTORNEY.

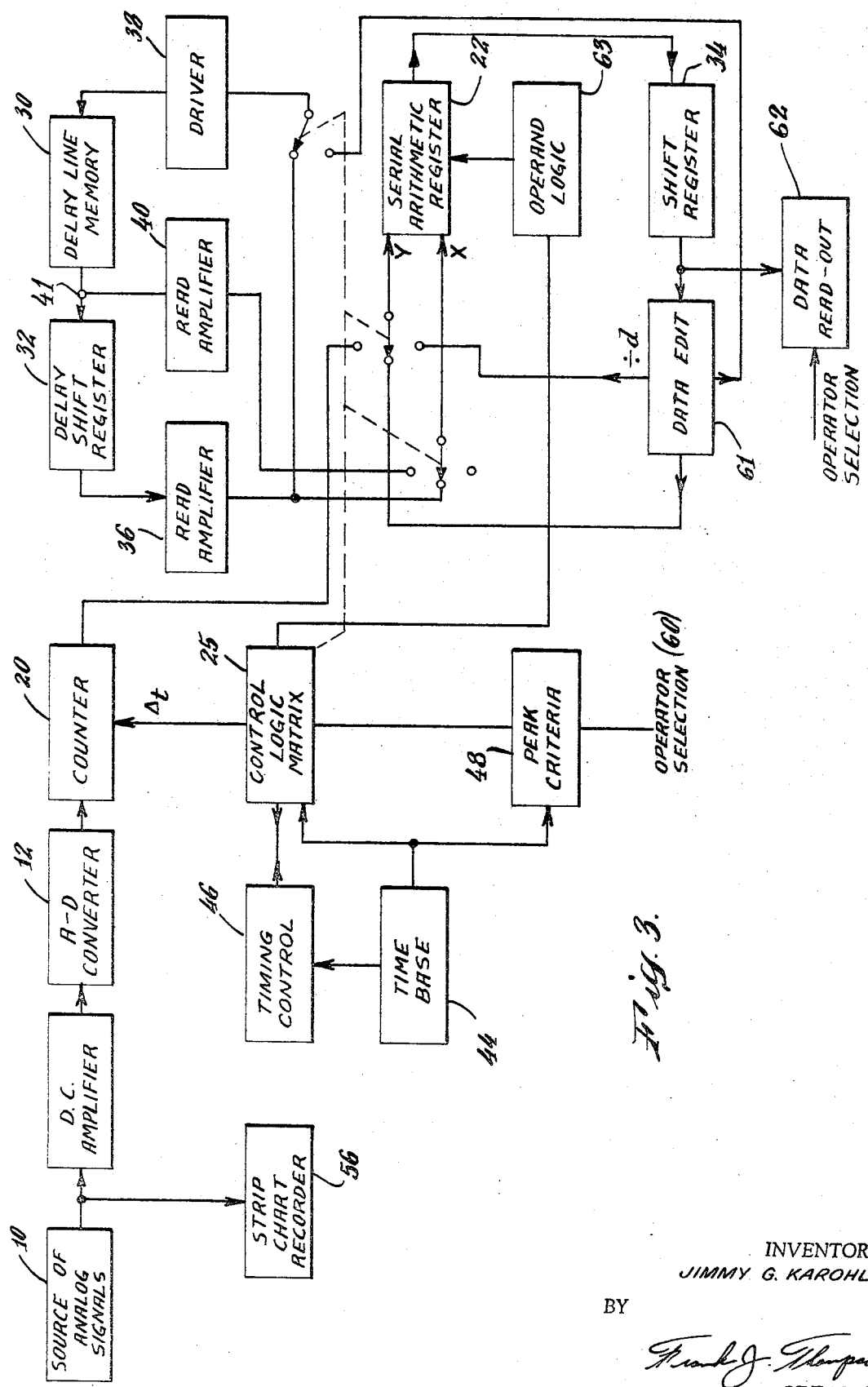

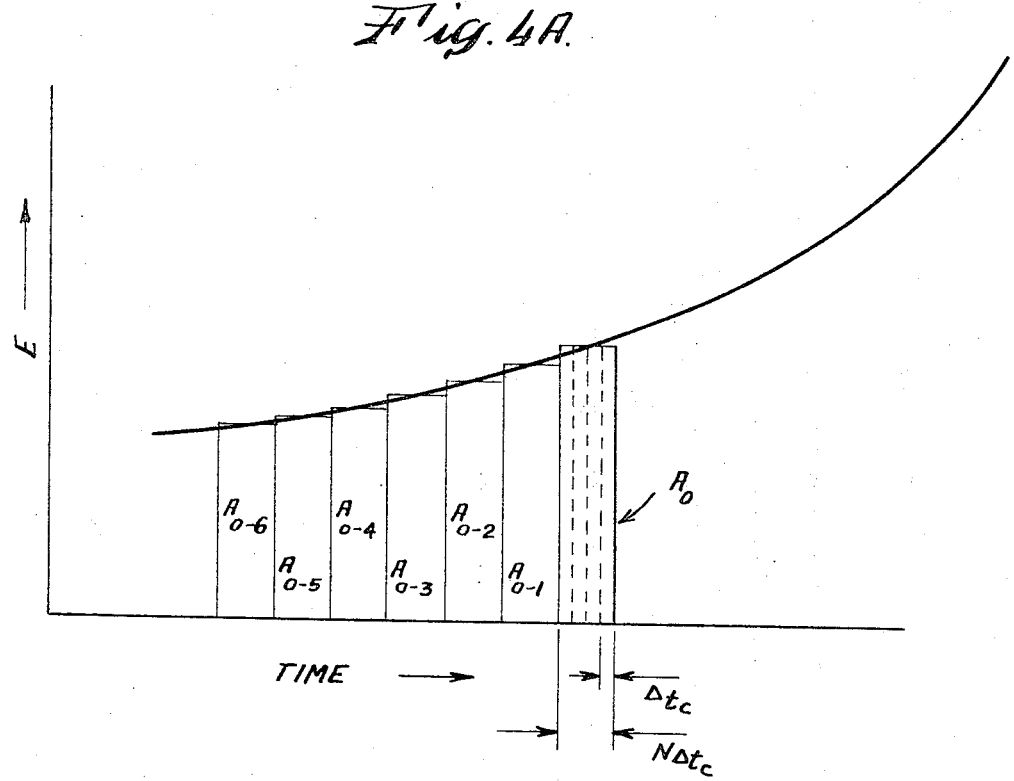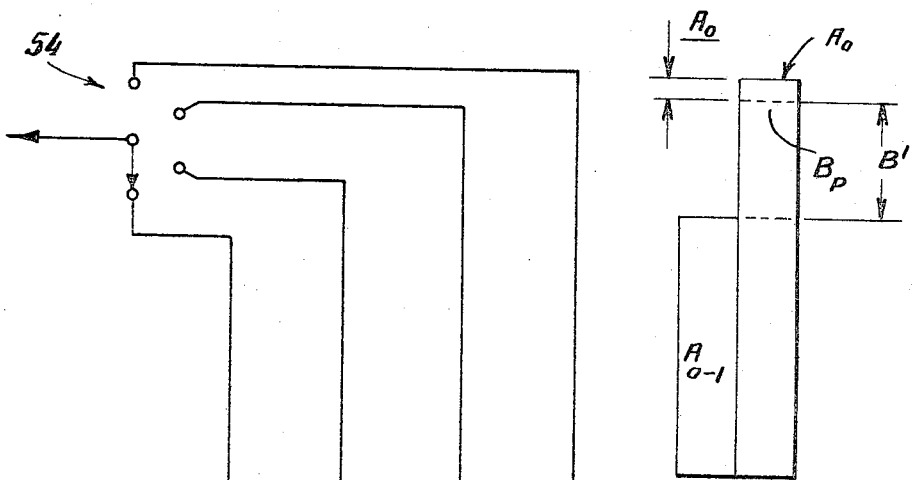

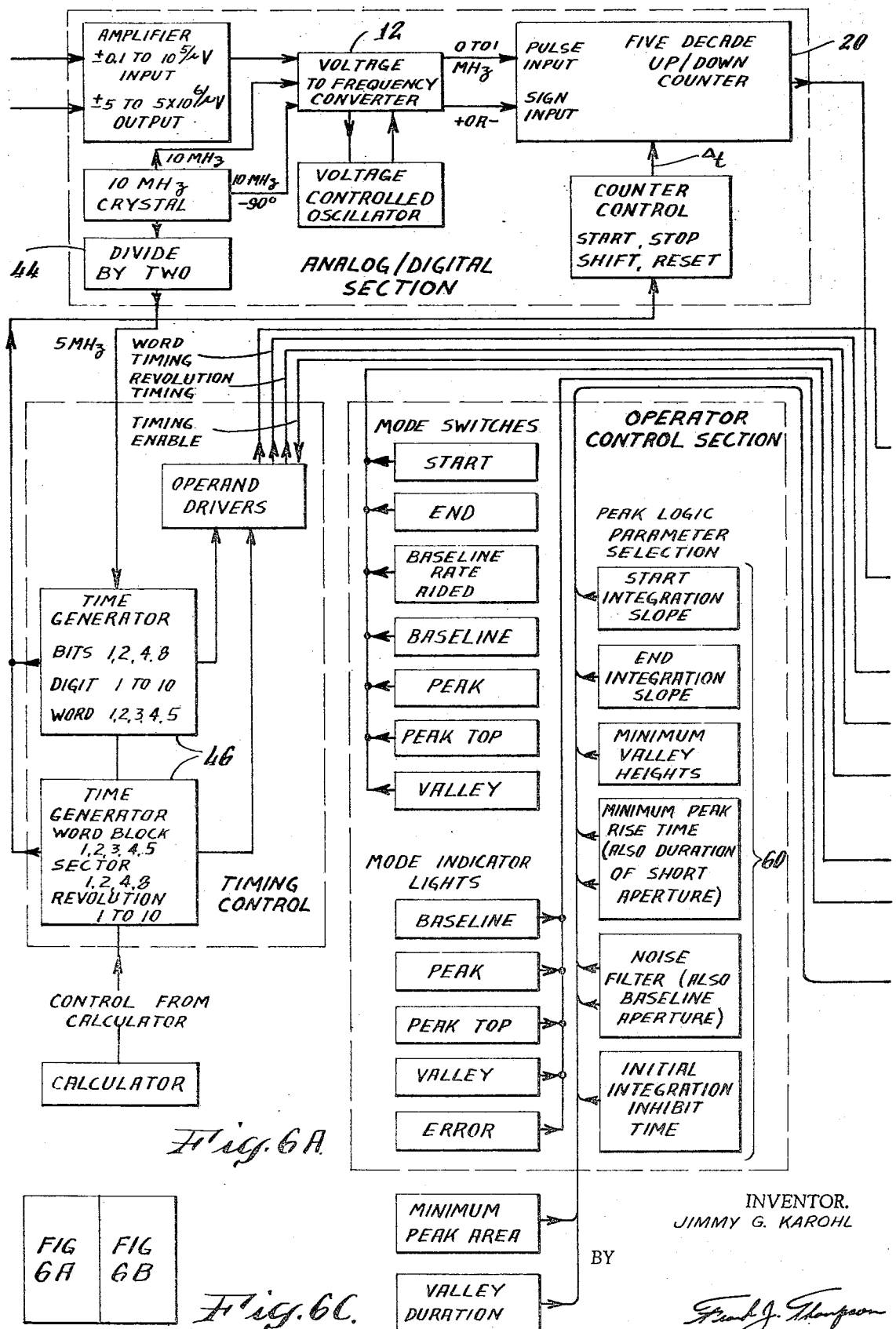

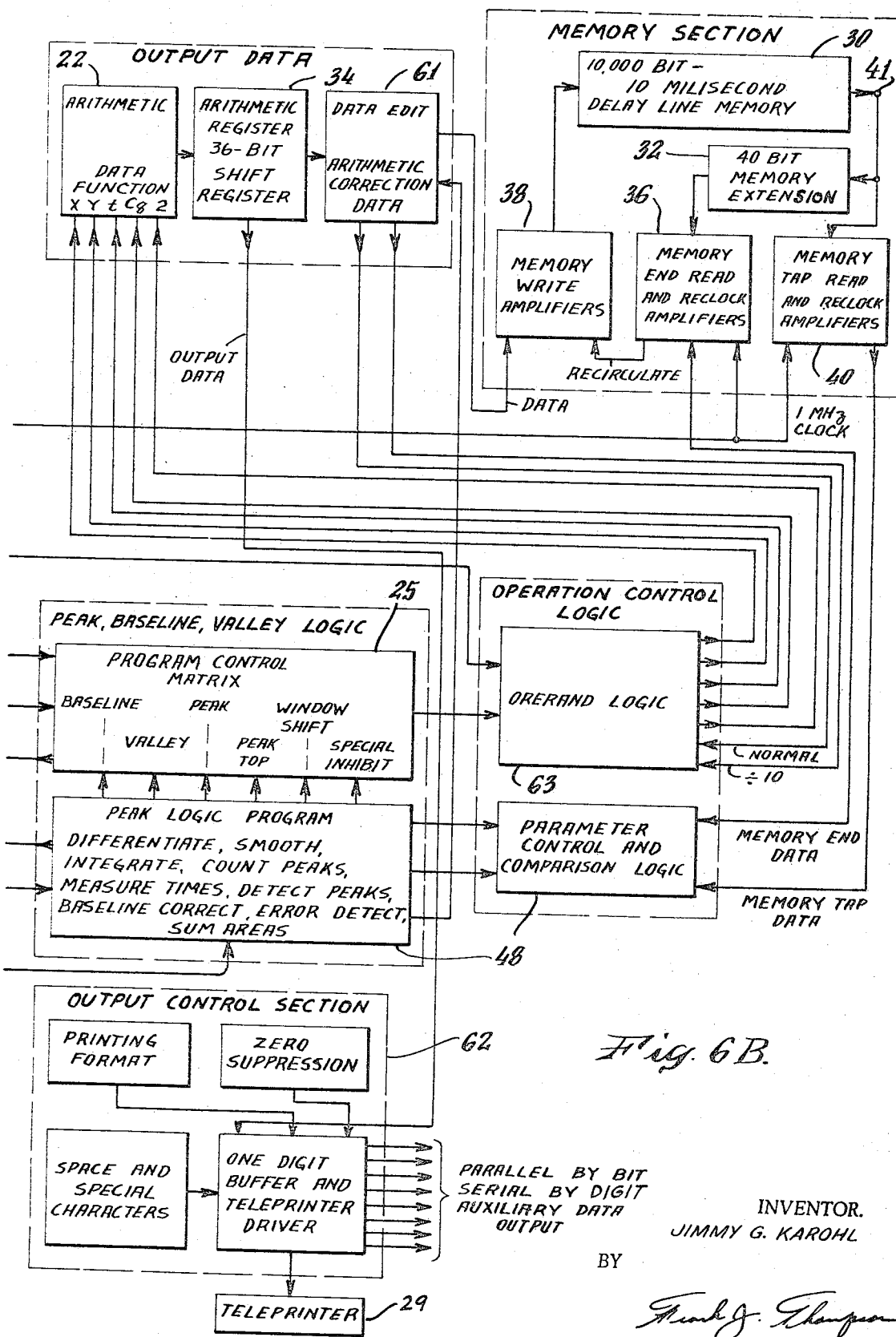

CHROMATOGRAM ANALYZER

This invention relates to electrical integrating apparatus. The invention relates more particularly to integrating and computational arrangements for receiving and operating on data which occur successively in time.

In various types of equipment, output data representative of an analysis occurs successively in time. For example, a gas chromatograph presents output data in the form of electrical analogue signals having a baseline component and successively occurring peak components of differing area, peak height and degree of resolution. The various degrees of resolution result in the occurrence of both completely resolved peaks and overlapped peaks having a valley therebetween. The area of each of these peaks relative to total area, the peak height, and their relative time of occurrence contains quantitative and qualitative information valuable for identifying and measuring the components of a test sample under analysis. Beneficial use of this data had previously required the instrument operator to graphically measure the peak areas and to perform other measurements and calculations which are both time consuming and laborious.

Various integrating apparatus have been utilized for automatically operating on this data to transform the data into useful information for the operator. These apparatus generally include a circuit arrangement adapted for converting the analogue electrical signals into digital representations and for summing the digital representations in order to generate an integral of the peak envelope, i.e., the peak area. The integrating apparatus integrates the area under a peak from a reference voltage of zero amplitude. The peaks extend from the baseline component having an amplitude subject to relatively slow variations during an analysis. An accurate integration must be made with respect to the baseline and therefore requires compensation for the baseline and its variation. Baseline compensating means provided heretofore have operated to provide an absolute correction of the integrated peak area from a zero reference level, or alternatively have comprised electromechanical arrangements which were relatively complex and costly.

Integration of the area under a peak is initiated upon the occurrence of a signal slope positive with respect to the baseline slope, and terminated upon the occurrence of a small signal slope negative with respect to baseline. Analogue slope detecting arrangements have been utilized for sensing the signal slope with respect to zero slope in order to indicate the initiation and termination of a peak, as well as the top of the peak. These arrangements at times do not provide the accuracy desired for use with an analytical instrument.

Accordingly, it is an object of this invention to provide an improved computational apparatus for integrating the area under peaks.

Another object of the invention is to provide an improved computational apparatus particularly adapted for use with an analytical instrument of a type providing output data in the form of successively occurring peaks.

Another object of the invention is to provide a digital peak integrating apparatus of relatively low cost and complexity.

A further object of the invention is to provide an improved baseline correction arrangement for use with an integrating apparatus.

Various sample analyses exhibit differing slope characteristics indicative of the initiation and termination of a peak. It is therefore desirable to provide adjustable means for establishing peak criteria for each analysis.

Another object of this invention is to provide an improved arrangement for sensing the initiation and termination of a peak.

A further objective of the invention is to provide adjustable means for establishing the desired criteria for peak initiation and termination.

Another object of this invention is to provide an improved computational apparatus particularly adapted for distinguishing a baseline segment from a valley segment occurring between peaks which are unresolved by the analytical instrument.

In accordance with features of the present invention, an analogue signal having baseline, peak, and valley components is converted to frequency related digital representations. Circuit means provide for the accumulation of the digital representations over successive intervals of time, $t_c$. Control circuit means provide for the periodic transfer of each of the accumulated digital representations to an electrical digital storage means. Circuit means establish a peak slope criteria in electrical digital form representative of a characteristic of a peak. Circuit means are also provided for comparing N stored digital representations and the slope criteria and for continuously summing baseline corrected representations when a peak indication criteria has been satisfied and for terminating baseline corrected summations when an end of peak slope criteria occurs.

These and other objects and features of the invention will become apparent with reference to the following specifications and drawings, wherein:

FIG. 3 is a detailed block diagram of one embodiment of the analyzer apparatus of the present invention;

FIGS. 4A, 4B, 4C and 4D are diagrams of an analogue signal illustrating portions of an analogue signal in enlarged form;

FIG. 5 is a block diagram of one embodiment of the operator criteria selection apparatus utilized with the analyzer apparatus of FIG. 3; and FIGS. 6A and 6B taken together as indicated in FIG. 6C is a more detailed block diagram of the analyzer of FIG. 3.

Briefly stated, the analyzer of the present invention continuously computes successive digital sums A of pulses derived from an analogue to digital converter, each sum being representative of the average amplitude of the analogue input signal during N corresponding successive intervals of time $t_c$. Successively generated sums formed during a prior period of time T are stored and from this data the average rate of change of slope B' of the baseline is calculated. The amplitude of a sum, designated $B_p$, occurring next in time is predicted with available data and is compared with the sum $A_o$ as actually measured. A difference in amplitude, $\underline{A_o}$ existing between the predicted sum $B_p$ and actually measured sum $A_o$ is compared with preestablished criteria PC for indicating the beginning of a peak and a valley between unresolved peaks. An instantaneous slope $I_s$ is computed on the difference between $\underline{A_o}$ and on equivalent preceding differences $\underline{A_{o-1}}$ and is compared with preestablished criteria for sensing and indicating peak top and termination of a peak. Upon sensing the initiation of a peak, the difference $\underline{A_o}$ between predicted $B_p$ and actual $A_o$ sums is accumulated for the duration of a peak. A highly accurate baseline corrected peak integration is thereby provided.

Figure 1:
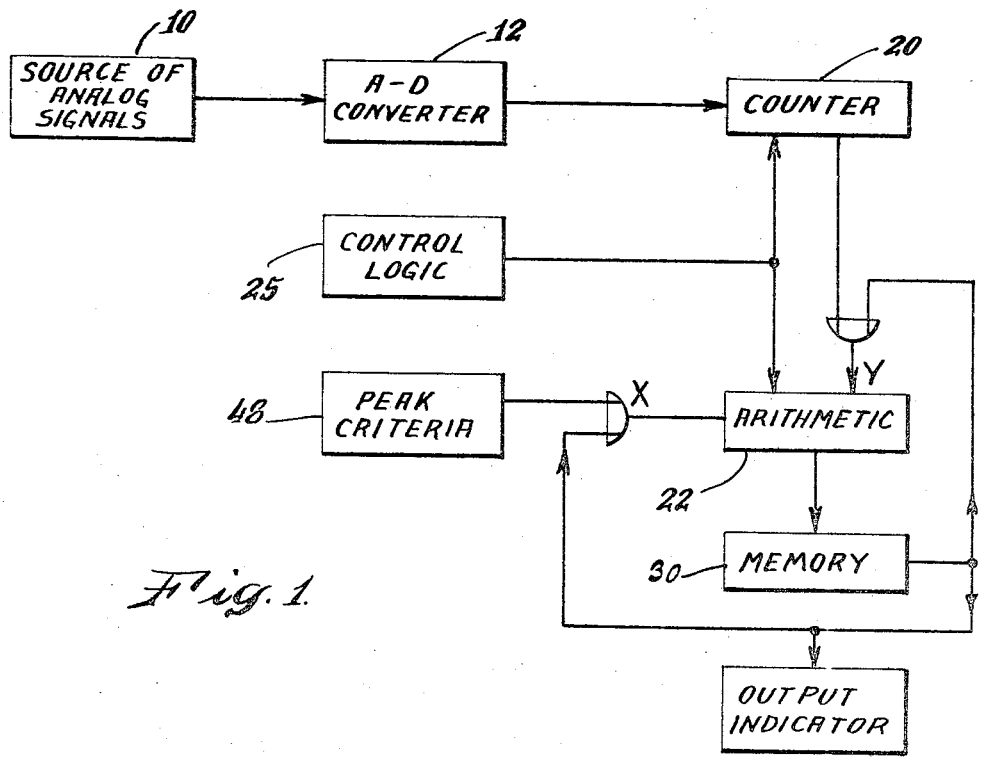
FIG. 1 is a diagram in block form illustrating the general operation of an analyzer apparatus constructed in accordance with features of the present invention.
Figure 2:
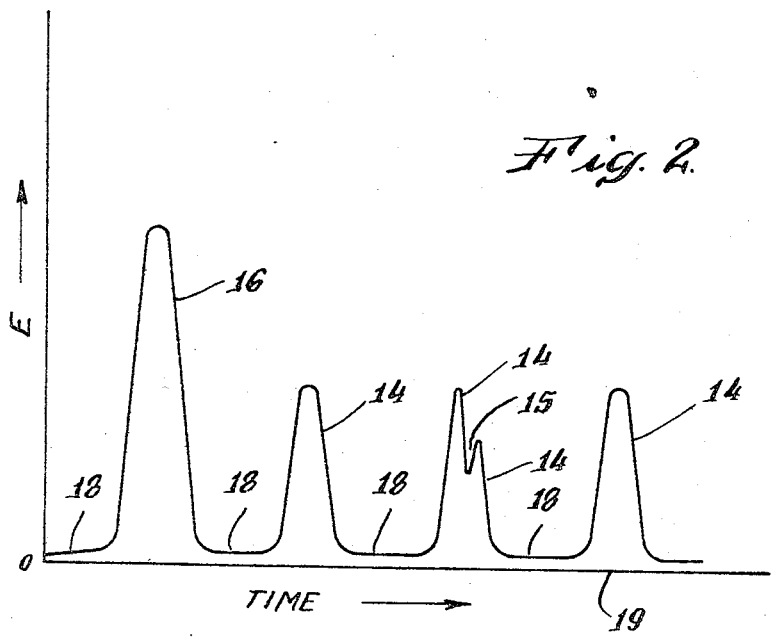
FIG. 2 is a diagram of an analogue signal having peak, baseline and valley components.

In FIG. 1, a source of analogue signals 10 of a type illustrated in FIG. 2 is coupled to voltage-to-frequency type of analogue to digital converter 12 for converting the analogue signals into corresponding frequency related digital representations. The source 10 comprises, for example, a gas chromatograph. The illustrated wave form of FIG. 2 includes peak components 14, 16, a valley component 15, and a baseline component 18. The peak components 14 and 16 are generally of varying height and area in accordance with the characteristics of a sample under analysis. In an output wave form from a gas chromatograph the area under each of the peaks 14 represents the relative concentration of a separated component while the relatively large peak 16 at times comprises a solvent peak caused by the initial elution of a sample-carrying solvent from a chromatographic column. These various peaks extend from the baseline component 18, the amplitude of which is subject to variation during the analysis. A peak extends from the baseline component, and in accordance with a feature of the invention integration is performed with respect to a measured baseline and component 18 a calculated baseline component, which measured component is measured with respect to a zero voltage reference level 19.

Output pulses from the converter 12 having a frequency varying in accordance with signal amplitude are applied to a binary counter 20 which accumulates an indication of the number of pulses applied thereto during a predetermined interval of time $t_c$. At the end of each such interval, the counter is automatically cleared and a successive count is automatically initiated. The count $S_c$ which is accumulated in the counter 20 during an interval $t_c$ and which represents the area under an increment of the waveform is transferred to an arithmetic register 22 and serially to a memory unit 30, described in greater detail hereinafter. A series of counts $S_c$ for a predetermined number N of the intervals $t_c$ are added in the arithmetic register 22 and their sum $A_o$ is stored in a predetermined memory location identified as $[A_o]$ in the memory 30. A plurality of previously formed similar summations are stored at similarly identified locations $[A_{o-1}]$, $[A_{o-2}]$, $[A_{o-3}]$, $[A_{o-4}]$, $[A_{o-5}]$ and $[A_{o-6}]$ in the memory 30.

When the analyzer has equaled pulses during a predetermined number N of time intervals $t_c$ and has formed and stored the sum $A_o$ at memory location $[A_o]$, the control logic 25 automatically causes the analyzer to operate in a peak-sensing mode, PSM. FIGS. 4A and 4B are diagrams of portions of the analogue signal illustrating the summation intervals and are helpful in understanding analyzer operation during PSM. Previous summations represented by $A_{o-1}$ through $A_{o-6}$ were computed and stored and summations prior to $A_{o-6}$ have been discarded. In addition, successive differences between these summations were previously computed, summed, and averaged to generate the average difference in amplitude B' over the period of time T represented by these summations. The operations are performed by arithmetic register 22 and the resultant of each arithmetic register operation is stored in the memory 30. During PSM, a count which is representative of a predicted baseline $B_p = B' + A_{o-1}$ is computed. $B_p$ represents a prediction by the analyzer of the magnitude of the sum $A_o$ if a peak is not initiated during the occurrence of $A_o$. If a peak in fact does not occur, then the baseline varies at the rate B' during the interval, and the predicted baseline is nearly equal to the actual sum $A_o$. That is, $B_p = B' + A_{o-1} = A_o$ in the absence of a peak. The analyzer then senses for a difference in magnitude between $B_p$ and $A_o$ by performing the operation $\underline{A_o} - B_p = \underline{A_o}$ in arithmetic unit 22. This difference $\underline{A_o}$ is then compared with operator-selected peak criteria $\overline{PC}$. If $\underline{A_o}$ is greater than or equal to PC, the presence of a peak is established and the analyzer then operates in a peak area accumulating mode, PAM. If $\underline{A_o}$ is less than PC, then $A_o$ is shifted to the $[A_{o-1}]$ memory location and a PSM is reinitiated upon entry of a new sum, $A_o$.

Recycling of PSM is accompanied by a recalculation of B' in order to take into consideration the change in baseline amplitude occurring between the summations $A_{o-1}$ and $A_o$. The data in the successive memory locations $[A_{o-1}]$ through $[A_{o-6}]$ is transferred to the memory and the successive differences are formed. The sum of these differences is then arranged to form B' which is stored for use in the subsequent PSM mode.

When a peak is sensed and upon initiation of a peak area accumulating mode PAM, baseline prediction continues in the manner indicated. However, the last B' formed is retained and employed as the average rate of change of baseline. B' is added to $A_{o-1}$ to form a predicted baseline $B_p$ during PAM. $B_p$ is continuously updated during each period T in PAM for generating a predicted baseline during this mode.

Integration of the area under the peak corrected for baseline is accomplished by performing the summation $A_p = \Sigma \underline{A_o}$ where $\underline{A_o} = A_o - B_p$ and where $A_p$ represents the successive summation of incremental areas $\underline{A_o}$.

Each successively generated $\underline{A_o}$ represents the incremental area greater than baseline and is added to each prior $\underline{A_o}$ generated during the PAM mode.

Figure 4C:
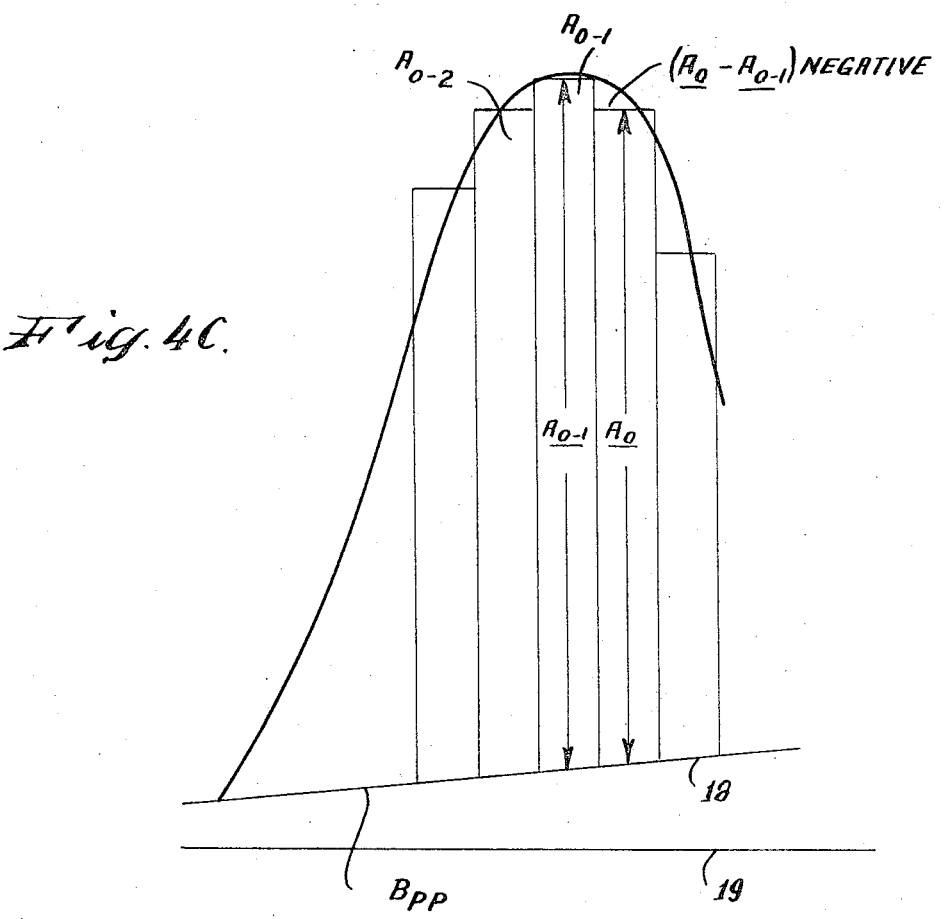

In addition to forming a predicted base line and calculation of $\underline{A_o}$ during each period N $t_c$ of PAM, the analyzer senses for a peak top (FIG. 4C). A peak top is sensed by calculating $I_s = \underline{A_o} - \underline{A_{o-1}}$, where $I_s$ represents the instantaneous slope of the peak during PAM. The first occurring $\underline{A_o}$ for which $I_s$ has a negative value indicates the occurrence of a peak top and the initiation of a back slope portion of the peak. In FIG. 4C, the intervals N $t_c$ are exaggerated for illustration. The interval of $A_o$ would normally occupy a small interval of the peak vase and the peak top will be more closely resolved. In this regard, the analyzer resolution is automatically variable and during the PAM mode, the time resolution is automatically increased. The increase is by a factor of 5, for example, and in one arrangement the period N $t_c$ is one second during PSM and is reduced to .2 seconds during PAM. This is accomplished by altering N.

Figure 4D:
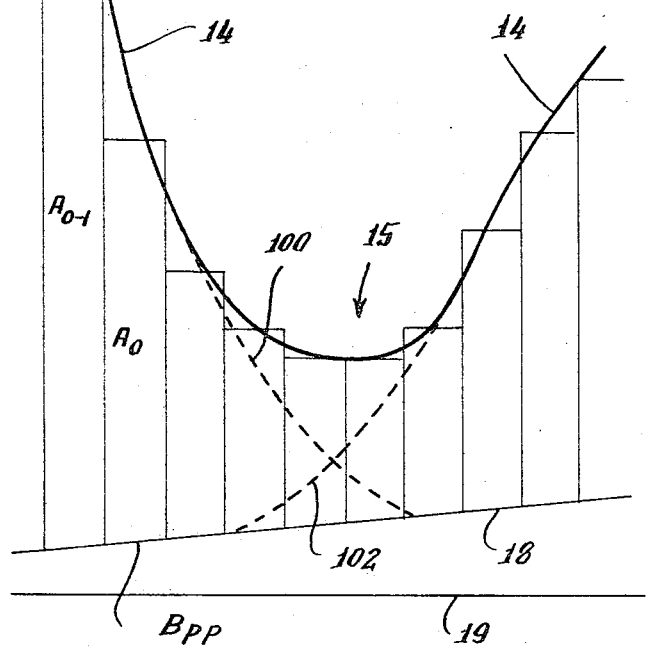

As previously indicated, the output wave form of a chromatograph or other instrument can include unresolved peaks having a valley therebetween as indicated in FIG. 2. In accordance with another feature of the present invention, the analyzer is adapted for distinguishing between a valley occurring between unresolved peaks and a base line of relatively short duration. During the peak-accumulating mode PAM and subsequent to the indication of the occurrence of a peak top end, the analyzer compares $I_s$ with preselected criteria, $PC_2$. $PC_2$ is a criteria indicating the occurrence of valley and termination of peak integration. $I_s$ exhibits a negative value on the peak back slope (FIG. 4D). After each accumulation $A_o$, the sign of $[PC_2 - I_s]$ is sensed. A change in $[PC_2 - I_s]$ sign from negative to positive indicates the presence of a valley between peaks or a return to baseline. In order to resolve this ambiguity, $[A_o - VC_1]$ is calculated. $VC_1$ is a preestablished valley criteria representative of minimum amplitude of a valley. The sign of $[A_o - VC_1]$ becoming negative indicates the existence of a base line 18 rather than a valley 15. Real, elapsed time since termination of peak integration is compared against valley criteria $VC_2$ representative of minimum duration of a valley. Failure to satisfy $VC_2$ indicates occurrence of a base line 18. PSM mode occurs during all modes of analyzer operation except between the beginning of PAM and peak top.

The analyzer is adapted for distinguishing between a noise impulse occurring in the analogue signal and a true peak. During a peak sensing mode PSM, the analyzer additionally compares elapsed time since the start of PAM with preestablished noise criteria $NC_1$. A peak would not ordinarily exhibit a rise time in excess of that represented by $NC_1$. If peak top occurs before $NC_1$, then the peak is judged to be a noise impulse. Also, the accumulated peak area, $A_p$ is compared to noise criteria $NC_2$ representative of the minimum area which is expected for a peak between the beginning of PAM and peak top in a particular analysis. Satisfaction of either noise criteria indicates a noise impulse rather than a true peak and the noise pulse is automatically disregarded.

The performance of the various analyzing steps is based upon serial computing techniques utilizing, as illustrated in FIG. 3, an acoustical delay line memory 30, a delay shift register 32, the arithmetic register 22 and an arithmetic shift register 34. The delay line 30 is conventional and is adapted for dynamically storing a relatively large number of words, each having a plurality of bits. Each word for example may comprise ten digits, and each digit comprises four binary coded decimal bits so that a word is formed by 40 bits. In a particular delay line memory adapted for use with the present invention, a memory capacity of 10,000 bits is provided and successive word locations designated $[S_8]$ are utilized for baseline and peak detection analysis. Successive word locations designated $[S_9]$ are utilized for buffering output information to permit matching the data output to the printing speed of the page printer 29. The delay shift register 32 is a conventional shift register having a plurality of stages formed of semiconductor bistable elements and having a sufficient number of stages to form a 40-bit shift register, i.e., one word length long. The delay shift register 32 is provided in order that data wanted at successively positioned words locations in the memory become simultaneously available for computation.

Arithmetic register 22 is a conventional register adapted for dynamic serial addition, nines complement subtraction and multiplication by the factor 2 on data applied to input terminals X and Y. The serial arithmetic register 22 is a register formed of a plurality of bistable semiconductor stages. A register of this type includes a number of stages, for example, four. The arithmetic shift register 34, in addition to operating as a buffer register for printout equipment 29 provides the arithmetic result of register 22 at terminal Y in time coincidence with additional input data coupled to terminal X of register 22. In this regard, the register 34 includes a sufficient number of stages for storing one word length less the number of bits in the register 22. In the particular example given, shift register 34 is 36 bits long and is formed in a conventional manner from semiconductor bistable elements. A data editing register 61 is provided for correcting for carries, etc. In addition this register is tapped for providing an output result divided by a factor $d$. In a typical arrangement $d=10$.

Information stored in the delay line memory 30 is continuously recirculated by a read amplifier 36 and a driver amplifier 38. A second read amplifier 40 senses data as it appears initially at an output terminal 41 of the delay line 30. This arrangement provides for arithmetic operations on data located at successive positions on the delay line.

As indicated, the various registers referred to are conventional and use serial, dynamic, digital computing techniques. The following publications describe in detail such registers and techniques: "Handbook of Automation, Computation and Control;" Volumes 1 and 2; Grabbe, Ramo and Wooldridge, Editors; Wiley & Sons; 1959; and "Pulse and Digital Circuits;" Millman and Taub; McGraw Hill; 1956.

The analyzer is a fixed program type of analyzer in which the program is stored by control logic matrix 25. The particular intercoupling of the units 22, 30—41 is controlled by the control logic matrix and is a function of the mode of operation of the analyzer. The mode of operation is in turn automatically dependent upon the nature of the input signal as indicated hereinbefore. When analyzer operation is initiated, the control logic causes the analyzer to operate in a peak sensing mode, PSM. When the analyzer senses a particular condition, the control matrix unit 25 functions to alter the intercoupling of the analyzer units in a manner for providing a new desired mode of operation. Although this coupling is illustrated in FIG. 3as being provided by rotary contacts operable from the control matrix 25, it is understood that this is diagrammatic and that the switching functions are performed by conventional electronic gating techniques.

Electric timing signals for synchronizing operation of the analyzer are derived from a stable oscillator and frequency divider, indicated as the time base 44 in FIG. 3. In addition to generating clock pulses at a reference frequency for use throughout the apparatus, the time base applies clock pulses to a delay line storage record unit 46. This storage unit which includes counter stages for frequency division is intercoupled with the control matrix 25 and is adapted for providing signals to the control matrix 25 indicative of the location of data on the delay line. This is effected by counting pulses, each representative of a bit on the delay line.

The control matrix 25 comprises a conventional diode matrix array adapted for sensing voltage levels indicative of conditions occurring within the apparatus and for providing desired control in to the occurrence of these conditions. For example, and as indicated in greater detail hereinafter, when the arithmetic unit indicates the initiation of a peak, then the control matrix 25 effects a modification of the mode of operation and causes a PAM wherein peak summation data is accumulated. A shift signal is derived from the matrix 25 and applied to the counter 20 for shifting the contents thereof in serial fashion out of the counter and for leaving the counter in a cleared condition after each interval of time $t_c$. As illustrated, this data will be shifted to the Y input terminal of the arithmetic register 22.

The various peaks 14 of the analogue signal, illustrated in FIG. 2, can exhibit widely varying slopes in accordance with the characteristics of the sample under analysis. Means represented by block 48 in FIG. 3 are provided for selection of criteria indicative of the initiation, termination, valley and noise spikes. This means is illustrated in greater detail in FIG. 5. Clock pulses which are derived from the time base 44 are supplied to a four-stage binary counter 52. An output terminal from each of the flip-flop binary stages is coupled to a terminal of a rotary switch 54. The counter provides frequency division and a one of four count rates is selectable. These pulses will then occur in serial fashion and are applied to the control matrix for comparison with the result of the arithmetic register 22.

The method by which the analyzer processes input information will now be described with reference to FIG. 3. As previously indicated, the analyzer operates in a plurality of modes in accordance with the characteristic of sensed data. In the PSM mode, the continual sensing of baseline amplitude occurs in order to detect an amplitude increase $A_o-B_p$ significantly large so as to represent the initiation of a peak in accordance with the preestablished peak criteria. After a sample has been introduced to a gas chromatograph, for example, analyzer operation is initiated and the counter 20 continuously accumulates input pulses for the interval $t_c$. During the usual analysis, the base line component will now be occurring. At the expiration of $t_c$ the control matrix 25 generates a signal for transferring the counter contents $S_c$ to a delay line storage location, $[A_o]$. In accomplishing this result, the control matrix simultaneously conditions gating circuit arrangements, represented by the rotary switches, for directing the transfer of the counter data to the Y input terminal of the arithmetic register 22. The delay line storage and timing control unit 46 synchronizes the occurrence at terminal X of data existing in the delay line memory at position $[A_o]$. Control matrix 25 signals the register 22 to add the input data at terminal Y to the memory contents at terminal X, and to reinsert this data in the same memory location, $[A_o]$. In this regard it will be noted that the control matrix 42 orders the read amplifier 40 to provide the desired data at input terminal X. Since the delay register 32 provides a one-word delay in the basic recirculation loop, and since the shift register 34 and arithmetic register 22 in combination represent one word length, then the result of the arithmetic addition of the counter contents and memory location occur at the output of the shift register 34 in proper synchronism for insertion at the desired memory location on the delay line. The counting for the period $t_c$ is performed N times, where N=10 for example, prior to slope sensing. Thus the count occurring during the interim N $t_c$ is accumulated in a particular memory location on the delay line. In the peak sensing mode PSM of operation, the analyzer operates on data at locations, $[A_o]$ and $[A_{o-1}]$ which occur successively along the delay line. At the termination of N counts, the control matrix causes the accumulation in memory location $[A_{o-1}]$ to be read out by amplifier 36 and coupled to the X input terminal of the arithmetic register 22. The last baseline rate of change B' is transferred from memory to register 22 and added to $A_{o-1}$ to form a predicted baseline $B_p$. Data in memory location $[A_o]$ and which represents the latest summation of N time intervals of $t_c$ is read by amplifier 40 and coupled to input terminal Y of the arithmetic register. Control logic 25 causes the register 22 to perform complementary addition on the inputs in order to determine the $\underline{A_o}$ difference between the actual sum $A_o$ and the predicted sum $B_p$. The peak criteria $PC_1$ occurring in serial pulse form is coupled to terminal X of the register 22 in coincidence with the arithmetic results $\underline{A_o}$. occurring at the output of shift register 34. A second complementary addition is performed for sensing a difference between the peak criteria $PC_1$ and the arithmetic result $\overline{A_o}$. A difference is sensed by the control matrix and when the criteria is detected to be of a smaller magnitude the control logic automatically causes the analyzer to operate in a peak accumulating mode, PAM.

In a PAM mode the analyzer continues to generate a predicted base line in order to provide base line corrected integration data, and additionally accumulates area data and senses for peak top. A predicted base line is initially formed in this mode by adding $A_{o-1}$ occurring when a peak was initially sensed and B'. This value, i.e., $(A_{o-1}+B')$ is continuously updated during each successive interval N $t_c$ by adding B' thereto to form a predicted baseline during a peak, $B_{pp}$. The value $\overline{A_o}$ is formed as indicated with respect to the PSM mode and $\overline{A_{o-1}}$ first stored in this mode are compared in order to detect a peak top. When $\overline{A_{o-1}}$ is greater than $\overline{A_o}$, a peak top is indicated and a peak termination mode is initiated (FIG. 4C). Additionally, during PAM, the $\overline{A_o}$ for each N $t_c$ is added to form a sum $A_p$ of such $A_o$'s. $\overline{A_o}$ represents the base line corrected data for a peak. Detection of a peak top generally indicates that half of the peak wave form has occurred. Summation of $\overline{A_o}$'s then continues until an end of peak is detected in the peak termination mode, PTM. The exchange of data between the various registers and the memory of the analyzer during PAM is under control of the control logic 25 as indicated. A more detailed description of this exchange is believed unnecessary.

The analyzer is adapted to automatically increase the peak resolution capability during PAM and PTM modes. At times a peak may exhibit a relatively narrow base width and increased resolution is desirable. At the initiation of PAM the analyzer automatically decreases the number N of intervals $t_c$ by a predetermined factor such as 10. The decreased number of intervals N $t_c$ is employed until the end of the peak termination mode, PTM. Control logic 25, after detection of a peak, decreases the number N of intervals by the desired factor. Peak criteria are similarly scaled by any conventional means by a same factor for providing coherence between data, time interval, and peak criteria.

During a peak termination mode, PTM, the control logic 25 causes an exchange of data between registers in a manner similar to that described with respect to PSM and PAM modes. A predicted base line, $B_{pp}$, is generated, $\overline{A_o}$ is formed for each N $t_c$ interval, and $\overline{A_o}$'s are continuously summed. In addition however, $I_s$ is compared with a peak criteria $PC_2$, which is indicative of a slope significantly small so as to represent valley or base line rather than peak. When this criteria is met, the analyzer then functions in a valley-sensing mode, VSM.

Unresolved peaks (FIG. 2) are separated by a valley 15. An uncertainty occurs during the PTM mode in that as the analyzer senses a relatively small negative slope satisfying $PC_2$, the analyzer thus far described has not detected whether this relatively low slope represents a valley or a true base line (FIG. 4D). The analyzer in accordance with another feature of the invention, senses for valleys following a peak. Valley criteria are established in serial digital form as are peak criteria, and accumulating data is compared with the valley criteria. The valley criteria include maximum height of the curve expected for a valley and maximum duration expected. These steps are fix-programmed in the control logic section 25.

An analogue signal of the type under consideration is at times subjected to electrical noise or noise from other sources resulting in short noise peaks in the wave form. These spikes interfere with proper analysis when they are of significant duration and height. During each of the modes of operation, the analyzer of the present invention is adapted to distinguish noise pulses from true peaks. Criteria representative of a noise spike is established by the operator in the same manner as peak and valley criteria. These criteria include maximum slope which would be expected with a peak and impulse duration. Each impulse is compared with the established criteria and when the slope rate is exceeded and duration not exceeded, a noise impulse is indicated and is disregarded.

The analyzer includes provision for three elapsed time clocks provided by three memory locations in the recirculating memory 30. The first clock is reset and started by the operator at the initiation of an analysis. The time recorded by this clock is automatically noted at the occurrence of each peak top. A second clock is started at the initiation of a peak accumulation mode PAM. This clock is compared against the rise time criteria as described hereinbefore. The third clock is started at PAM termination and compared against the valley duration criteria $VC_2$ as described hereinbefore.

Performance of the hereinbefore described functions by the analyzer is synchronized by the timing control unit. The sinusoidal wave form produced by a quartz crystal controlled oscillator is converted to a pulse wave form by conventional pulse shaping circuitry. The timing control unit produces a series of pulses corresponding in time to the desired time of appearance of desired words and bits at the delay line memory end or the delay line memory extension. This series of pulses, synchronized in time, are applied to the operand logic unit 63. The operand logic unit is an assembly of conventional power amplifiers and logical gates. The resulting pulses, amplified in power, are applied to appropriate sections of the serial arithmetic unit.

The control logic unit 25 is assembled from conventional flip-flops and logical gates. The control logic unit is synchronized to the rate of data circulation in the delay line memory unit by the series of timing pulses described hereinbefore.

The sequence of analyzer operations is controlled from a set of flip-flops and decoding logical gates. The series of timing pulses are applied sequentially to the entire set of logical gates. Appropriate gates are opened by flip-flops set by the previous state of analysis. Initiation of the analyzer operation sets the base line mode and PSM flip-flop and the initialization control flip-flop. The initialization flip-flop signal opens appropriate gates which pass timing control pulses for resetting the arithmetic unit and the memory unit. Similar flip-flops are connected together such that each analyzer mode occurring during an analysis is sequentially remembered by a flip-flop for that mode. The initial mode, baseline and peak search mode is decoded by logical gates so as to interconnect the delay line memory, the arithmetic unit, and the analogue-to-digital converter. Calculations are performed on the numerical data received from the analogue-to-digital converter at the end of each time period. Upon the detection of a peak, the analyzer changes modes of operation by resetting the base line and PSM flip-flop and setting the peak accumulation mode flip-flop. The set condition of the PAM flip-flop opens the unique set of logical gates which interconnect the memory unit, the arithmetic unit, and the analogue-to-digital converter. Additional flip-flops record the remaining operating modes as described. The interconnections are so arranged that timing pulses which are synchronized to each electrical digital representation in the memory unit may activate the arithmetic unit to perform the desired calculations on the appropriate data from the memory unit and to return the results to the memory unit. Similar arrangements of flip-flops and logical gates decode portions of the results of the calculations to detect the existence of prohibited conditions.

Defined prohibited conditions such as data magnitudes exceeding storage ability are detected. The prohibited conditions defined in this manner in this analyzer are: (1) counter overflow; (2) peak area overflow; (3) insufficient area of a measured peak to be a real peak; (4) insufficient time elapsed between PAM start and peak top; and (5) input voltage overrange.

After the data for a peak has been accumulated the analyzer continues to operate on subsequently occurring peaks until the end of the run. The instrument operator remains cognizant of the progress of the peak occurrences by means of a strip chart recorder 56 (FIG. 3). Print out of accumulated data from the memory by print out equipment 29 can be initiated by the operator. In addition to providing the integral of the area under individual peaks, the analyzer also provides peak top time, peak start time, baseline corrected peak maximum amplitude, sequential peak number, and a running summation of peak areas.

In a particular arrangement, the recirculating memory 30 will store the following data for computation as indicated hereinbefore:

| Variable | Meaning |
|---|---|
| [Location] | Location Contents. |
| $T_{pd}$ | Rise time clock. |
| $T_{vpl}$ | Valley duration clock. |
| $A_o$ | Most recent signal amplitude measurement. |
| $A_o{-1}$ to $A_o{-6}$ | Older signal amplitude measurements. |
| $B'$ | Calculated baseline deviation rate. |
| $B_p$ | Predicted baseline amplitude. |
| $B_{ps}$ | Predicted baseline amplitude scaled down by 5. |
| $A_o$ | Baseline corrected amplitude. |
| $A_o{-1}$ | Baseline corrected amplitude one time period previous to $A_o$. |
| $A_p$ | Peak area accumulation. |
| $I_s$ | Instantaneous slope. |
| $A_{pt}$ | Accumulation of all peak areas. |
| $T_{rt}$ | Total elapsed time clock since analysis began. |
| $P\#$ | Peak number accumulation. |

Table I illustrates the measurement of data as recorded from one form of the analyzer when a mixture of normal hydrocarbons $C_8$ n-octane) $C_9$ n-nonane, $C_{10}$ n-decane, $C_{11}$ n-undecane and impurities were separated by a gas chromatograph and the corresponding analogue output signal coupled to the analyzer.

TABLE I

| Peak No. | Peak start time, seconds | Peak amplitude, .5 microvolts | Peak top time, seconds | Peak area microvolt-seconds | Summation of peak areas, microvolt-seconds |
|---|---|---|---|---|---|
| 1 | 22 | 27 | 26 | 23 | 23 |
| 2 | 40 | 21 | 42 | 3 | 25 |
| 3 | 82 | 277 | 86 | 173 | 197 |
| 4 | 152 | 225 | 158 | 405 | 601 |
| 5 | 174 | 68,161 | 184 | 42,199 | 42,799 |
| 6 | 216 | 485 | 226 | 321 | 42,119 |
| 7 | 272 | 334,369 | 300 | 291,831 | 334,949 |
| 8 | 370 | 199 | 374 | 299 | 335,247 |
| 9 | 418 | 89 | 420 | 19 | 335,265 |

In the analyses, peak number 3 represents $C_8$ peak number 4 represents $C_9$, peak number 5 represents $C_{10}$, peak number 7 represents $C_{11}$, while the remaining peaks represent unknown impurities.

FIGS. 6A and 6B comprise a more detailed block diagram of an analyzer combination constructed in accordance with features of the present invention. FIG. 6C illustrates the combined relationship of FIGS. 6B and 6C.

An improved analyzer has thus been described which advantageously provides the integral or area under peaks while simultaneously providing dynamic baseline correction.

While we have illustrated and described a particular embodiment of our invention, it will be understood that various modifications may be made therein without departing from the spirit of the invention and the scope of the appended claims.

I claim:

1. A chromatogram analyzer for providing an integral of an area under a peak of a chromatogram corrected for variations in amplitude of a baseline component, comprising:

an analog-to-digital converter circuit arrangement for converting the amplitude of an electrical analogue signal into electrical digital representations;

a digital counter coupled to said converter for counting said digital representations to provide the sum $S_c$ of said digital representations during equal intervals of time $t_c$;

an electrical memory storage means having a plurality of memory locations for storing information in the form of electrical signals applied thereto;

arithmetic circuit means coupled to said digital counter and to said storage means for operating on two successive input signals for forming a resultant sum or difference thereof in accordance with a control signal applied thereto;

means providing and coupling to said arithmetic means a signal PC in digital form having a characteristic indicative of the initiation of a peak; and control circuit means coupled to said counter means and to said arithmetic means for controlling the operation of said counter and arithmetic means to thereby compare successive groups of digital resultants where each group comprises a sum of digital representations occurring during N intervals of time $t_c$, said control means forming a difference between successive groups, and summing said differences when said differences exceed the peak criteria characteristic represented by said signal PC.

2. The apparatus of claim 1 wherein said arithmetic circuit means under the control of said control circuit means compares groups of digital representations, each group of digital representations occurring in N $t_c$ intervals of time, where $N>0$.

3. Signal interpreting apparatus for operating on an analogue signal having a baseline component subject to amplitude variation and a peak component extending from the baseline component to provide a baseline corrected integral of the area under a peak, comprising:

an analogue-to-digital converter for converting the amplitude of the analogue signal into digital representations;

an electrical counter coupled to said converter for accumulating the digital representations occurring during successive intervals of time $t_c$;

electrical arithmetic means adapted for operating on first and second input signals to provide a sum or difference thereof in accordance with a control signal applied thereto;

an electrical digital storage means having a plurality of memory locations;

means for establishing a peak slope criteria in electrical digital form which is representative of a characteristic of a peak; and means comprising a plurality of logical gates for defining a plurality of different operational states coupling said counter and storage means to said arithmetic means, and said slope criteria means to said arithmetic means to thereby form a difference between successively occurring groups, each group representative of the sum of digital representations occurring during a number N of intervals $t_c$, and for periodically comparing the difference with said peak criteria, and for summing said differences when the criteria is satisfied.

4. The apparatus of claim 3 wherein said operational states include a peak sensing mode and a peak accumulating mode, said criteria defines the initiation of a peak, and said differences are summed during the occurrence of a peak.